United States Patent [19]

Zola et al.

[11] Patent Number: 4,859,994

[45] Date of Patent: Aug. 22, 1989

[54] CLOSED-CAPTIONED MOVIE SUBTITLE SYSTEM

[76] Inventors: Malcolm Zola; Marcia Zola; Daniel Zola, all of 56 Woodland Rd., Roslyn, N.Y. 11576

[21] Appl. No.: 112,665

[22] Filed: Oct. 26, 1987

[51] Int. Cl.$^4$ ............................................. G02B 27/02
[52] U.S. Cl. ..................................... 340/705; 358/88; 340/784; 352/90
[58] Field of Search .................. 340/705, 784; 358/88, 358/89; 352/57, 90, 99, 130, 132, 239; 350/331 R; 355/39

[56] References Cited

U.S. PATENT DOCUMENTS

| | | | |
|---|---|---|---|
| 4,636,866 | 1/1987 | Hattori | 358/88 |
| 4,647,966 | 3/1987 | Phillips et al. | 358/88 |
| 4,666,271 | 5/1987 | Gonsot | 355/39 |
| 4,673,266 | 1/1987 | Fiumi | 352/90 |
| 4,695,129 | 9/1987 | Faessen et al. | 358/88 |
| 4,772,943 | 9/1988 | Nakagawa et al. | 358/88 |
| 4,934,956 | 3/1988 | Butterfield et al. | 358/88 |

FOREIGN PATENT DOCUMENTS

| | | | |
|---|---|---|---|
| 2036369 | 6/1980 | United Kingdom | 352/90 |
| 2040134 | 8/1980 | United Kingdom | 358/88 |

Primary Examiner—David K. Moore
Assistant Examiner—M. Fatahi-Yar
Attorney, Agent, or Firm—Collard, Roe & Galgano

[57] ABSTRACT

An apparatus for displaying movie subtitles has a liquid crystal display capable of forming alphanumeric images in polarized light on a cross-polarized light background. A decoder, a microprocessor and a driver are used to transfer coded information on standard movie film into appropriate subtitles which are then formed on the liquid crystal display. A polarizing material is provided to selective viewers to enable the viewers to distinguish the alphanumeric subtitles from the liquid crystal display background. This polarizing material is provided in the form of glasses which can be cross-polarized to either the alphanumeric images or to the background thereby either providing darkened letters on a light background or light letters on a darkened background. The subtitle apparatus and the method for its use can be used as a closed captioning system to allow the hearing impaired to view movies in movie theaters without loss of the dialogue portion of the film. Those individuals not wearing the cross-polarized glasses would not see the subtitles.

10 Claims, 2 Drawing Sheets

CLOSED-CAPTIONED MOVIE SUBTITLE SYSTEM

BACKGROUND OF THE INVENTION

1. Field of the Invention

This invention relates to a liquid crystal display utilized in a closed-captioned subtitle system for movie theaters. More specifically, this invention relates to a liquid crystal display in which special glasses are utilized by the hearing impaired in order to see the subtitles and movie-goers able to hear, and who do not use the glasses, do not see the subtitles.

2. Description of the Prior Art

Liquid crystal displays are well known and have been used in many applications. A liquid crystal is a state of matter that mixes the properties of both the liquid and solid state. They are catagorized in two ways: (1) Thermotropic liquid crystals, prepared by heating the substance; and (2) Lyotropic liquid crystals, prepared by mixing two or more components, one of which is polar in character. The thermotropic liquid crystals are divided according to structural characteristics into two classes (1) nematic (thread-like) and (2) smectic. In the present invention, cholesteric (twisted) nematic liquid crystals with added chiral compound are sandwiched between two etched transparent glass electrodes. The molecules in the ordinary nematic structure maintain a parallel or nearly parallel arrangement to each other along the molecular axis. They are mobile in three directions and can rotate about one axis. These substances melt sharply at one temperature, but produce a turbid melt. On further heating to a higher temperature, the turbid melt abruptly changes to a clear isotropic liquid which exhibits the same optical properties in all directions. In the temperature range between the solid and the isotropic liquid, these materials are anisotropic, meaning their optical properties vary depending on direction of measurement with respect to the different crystal axes. These crystals are anisotropic with respect to light when viewed between crossed polaroids.

In the cholesteric-nematic structure, the direction of the long axis of the molecule in a given layer is slightly displaced from the direction of the molecular axis of the molecules in an adjacent layer. If a twist is applied to a molecular packing, a helical structure is formed. The helix has a pitch which is temperature-sensitive. The helical structure serves as a diffraction grating for visible light. Chiral compounds show the cholesteric-nematic (twisted-nematic) structure; for example, the cholesteric esters can be used.

If a back lighted nematic liquid crystal is placed between two crossed polarizers to form the liquid crystal display, the light would be polarized by passing through the first polarizer. The polarized light entering the cell would follow the twist of the nematic liquid crystal and would be rotated 90 degrees and, as such, can allow passage of the light through the second polarizer. Application of an electrical field changes the molecular alignment in the liquid crystal such that the polarization is not altered in the cell and no light is transmitted. Thus, an alphanumeric display can be formed by proper application of an electric field to form regions of polarized and cross-polarized light within the display.

All liquid crystals are fabricated in a similar fashion. A thin film of liquid crystal approximately .0005 inches thick is sandwiched between two glass plates. Electrodes are coated on the inside of the glass plates. The electrical equivalent circuit of this assembly is a capacitor with the liquid crystal as the dielectric. As indicated above, the preferred liquid crystal used in the present invention is a nematic crystal which, depending on temperature, exhibits both isotropic and anisotropic physical properties. The fabrication of liquid crystal displays is well known and will not be described in any detail here (see U.S. Pat. No. 3,322,485 to R. Williams). In addition, there are many methods of driving a liquid crystal display to produce the desired alphanumeric subtitle display and these driving systems will not be discussed in great detail herein.

It has been well known to provide subtitles on movies, particularly those in a foreign language, and methods to provide such subtitles are disclosed in U.S. Pat. No. 4,673,266 issued to Fiumi which discloses a method and apparatus for displaying subtitles which utilizes a microprocessor decoder system to detect and decode information contained on a standard movie film print. The microprocessor forms subtitles on suitable displays which are constantly viewable by those in the audience.

U.S. Pat. No. 4,647,966 to Phillips et al discloses a stereoscopic three-dimensional large-screen liquid crystal display which may be viewed stereoscopically using polarized glasses with appropriately oriented polarizing axes. This device uses liquid crystal light valves to produce images which are controlled, in real time, by computer image generation. U.S. Pat. 4,613,207 to Fergason discloses a liquid crystal image forming projector in which the light from the liquid crystal display is selectively scattered or transmitted by respective portions of the display. The patent teaches that a polarizer can be used to aid in this image production.

There has been a long felt need by the hearing impaired to be able to view movies in movie theaters with a subtitling system similar to that used on closed-captioned television programs. It would be especially helpful to provide a subtitle system for movie viewing in which only the hearing impaired would see the subtitles while the non-hearing impaired would listen to the dialogue without the distraction of subtitles on the screen. It can be seen that this would allow a family having one hearing-impaired individual to attend a movie viewing as a group with the hearing-impaired individual selectively being able to view the subtitles while his non-hearing-impaired relatives could listen to the dialogue in the usual fashion.

The subtitle system of the present invention provides a solution to this long-felt problem by providing a liquid crystal display under or at the lower portion of a standard movie screen which display utilizes only one polarizer in the optical system of the liquid crystal display. Thus, light transmitted through or reflected from the display can only be viewed by an individual wearing lenses which are polarized 90 degrees either to the single polarizer used in the liquid display optical system or to the image produced by the display. Normally, the cross-polarized lens would be mounted in special glasses either provided by the movie theater management or being the personal property of the hearing impaired individual for use in movie theaters or other situations where selective image viewing for the hearing impaired is provided in accordance with the concept of the present invention.

It can be seen that by utilizing the liquid crystal display in which polarized light is produced, only those viewing the motion picture through a polarized lens crossed with respect to the optical system of the liquid crystal display would be able to view the subtitles generated and, therefore, the hearing segment of the viewing audience would be totally unaware of the captioning. The system of the present invention satisfies a long-felt need among the hearing impaired and will enable them to attend viewings in a movie theater with their hearing relatives and friends. Those wearing the polarized lenses would still see the non-polarized light reflected from the movie screen, albeit at a slightly reduced intensity.

It can also be seen that the subtitle system of the present invention can be used to selectively provide subtitles for films such as when a film is shown in an area with a population speaking two different languages, for instance, an English dialogue film shown with Spanish subtitles selectively viewable by those members of the audience who do not understand spoken English but who can read Spanish. Additionally, an English dialogue film shown in a country where English is widely spoken as a second language and which film may not be "dubbed" into the dominant language in that country, can have native language subtitles selectively displayed for those who are unable to understand the English dialogue.

SUMMARY OF THE INVENTION

It is therefore an object of this invention to provide a system for displaying movie film subtitles which includes a liquid crystal display capable of transmitting alphanumeric images cross polarized with respect to a polarized background.

It is yet another object of this invention to provide a polarizing material in the form of glasses, which may be used by viewers to selectively block polarized light transmission either by the background or the alphanumeric display to thereby enable the viewers to distinguish the subtitles from the background of the liquid crystal display.

It is yet a further object of this invention to provide a simple, reliable and economical method of providing movie subtitles capable of being viewed by only a portion of the audience which portion may be hearing impaired.

Accordingly, the present invention provides a system for displaying movie film subtitles which includes a liquid crystal display capable of forming alphanumeric images in polarized light on a polarized light background with the polarized alphanumeric images being cross-polarized with respect to the background. The system is capable of reading coded information on the film strip and utilizes a microprocessor to drive the liquid crystal screen to produce the appropriate subtitles. A polarizing material in the form of glasses is either supplied by the management or is brought by the individuals wishing to view the subtitles, which material is cross-polarized with respect to the alphanumeric images or with the background to thereby enable the viewer to discern the images displayed. Individuals not wearing the polarizing glasses would simply see a band of low intensity light where the liquid crystal display was located.

Other objects and features of the present invention will become apparent from the following detailed description considered in connection with the accompanying drawings, which discloses two embodiments of the invention. It is to be understood that the drawings are to be used for the purpose of illustration only, and not as a definition of the limits of the invention.

BRIEF DESCRIPTION OF THE DRAWINGS

In the drawings, wherein similar reference characters denote similar elements throughout the several views.

DETAILED DESCRIPTION OF THE PREFERRED EMBODIMENTS

Figure 1:
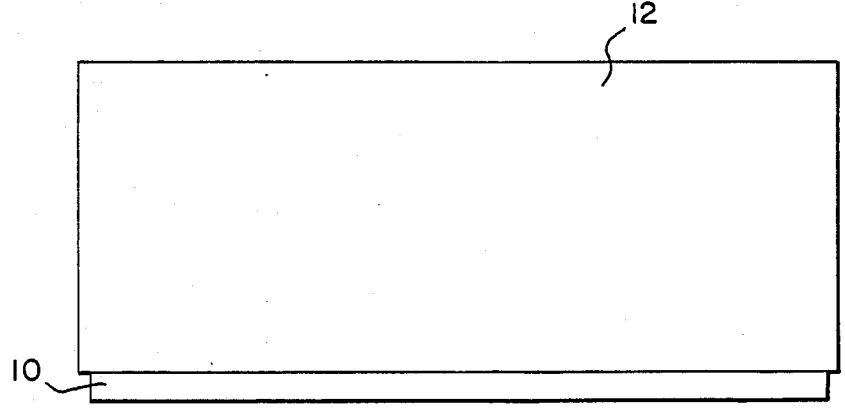
FIG. 1 is a view of a movie theatre screen including the subtitle system of the present invention.
Figure 2:
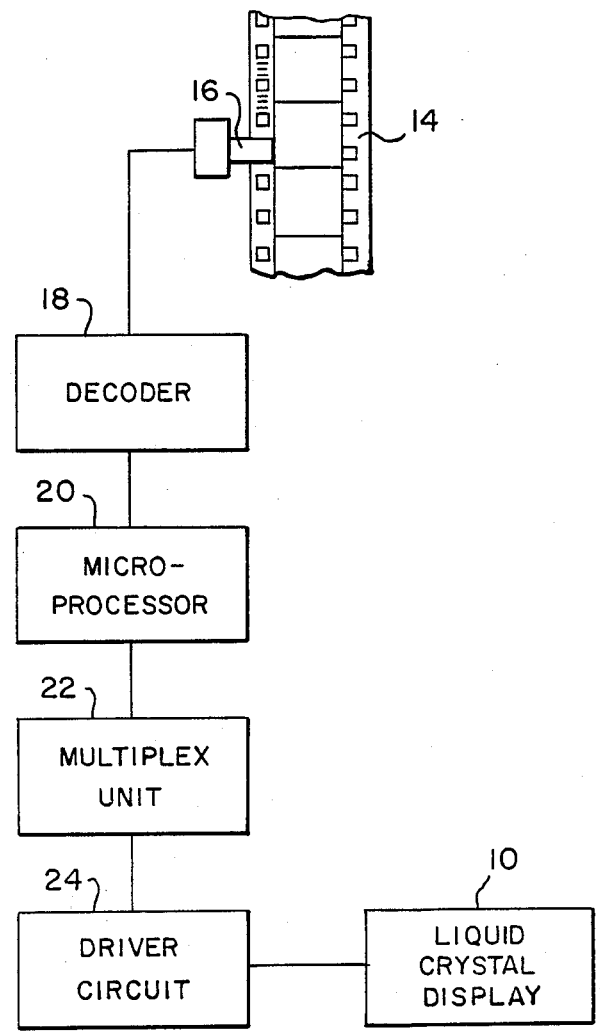
FIG. 2 is a block diagram of the decoding and display logic for the subtitle system of the present invention.

Referring to FIGS. 1 through 4, there is shown a subtitle system especially adapted for use in movie theatres. The subtitle system utilizes a liquid crystal display generally denoted as 10 which may be located along the bottom of a movie screen 12. The liquid crystal display may be located elsewhere as long as it may be viewed in conjunction with the motion pictures by members of the audience. The liquid crystal display 10 is capable of forming alphanumeric images in plane-polarized light on a cross-polarized background. The subtitle system has the ability to display sufficient alphanumeric characters to provide sufficient subtitles to correspond to the dialogue among the actors on the theatre screen.

A film strip 14 is normally utilized with a projector (not shown) to project a movie image onto the screen 12. A reader 16 is located adjacent film strip 14 and detects coded signals on the film strip and sends the signals to a decoder 18. The reader 16 is compatible with whatever method is used to encode the film strip with subtitle data. For instance, the film strip 14 may include subtitle data magnetically encoded on magnetic tape attached thereto which can be read by reader 16 and decoded by decoder 18. Decoder 18 produces output signals which are received by a microprocessor circuit 20 which has its output connected to a multiplex unit 22 (see U.S. Pat. 4,673,266 to Fiumi which discloses a detector and a microprocessor controlled thereby). The output of the multiplex unit is connected to and compatible with a driver circuit 24 which is then connected to and causes the image formation on liquid crystal screen 10. The microprocessor 20 utilizes the output of the decoder 18 to access its memory to generate the correct character on a liquid crystal display. The elements necessary to control a liquid crystal display are conventional and their method of interconnection is also well known (see for example U.S. Pat. No. 4,110,794 to Lester et al).

In an alternate embodiment, microprocessor system 20 can be supplied with a mass memory in the form of cards or discs or other elements which correspond to the movie being displayed, and wherein the decoded information from the film allows the microprocessor to access the pre-programmed subtitles stored in its memory. These pre-recorded subtitles would then be used to drive liquid crystal display 10 via driver 4. While it is contemplated that liquid crystal display 10 would display segments of dialogue in series, it is also possible to utilize the microprocessor system to produce a continuous display where words proceed from left to right across the liquid crystal.

Figure 3:
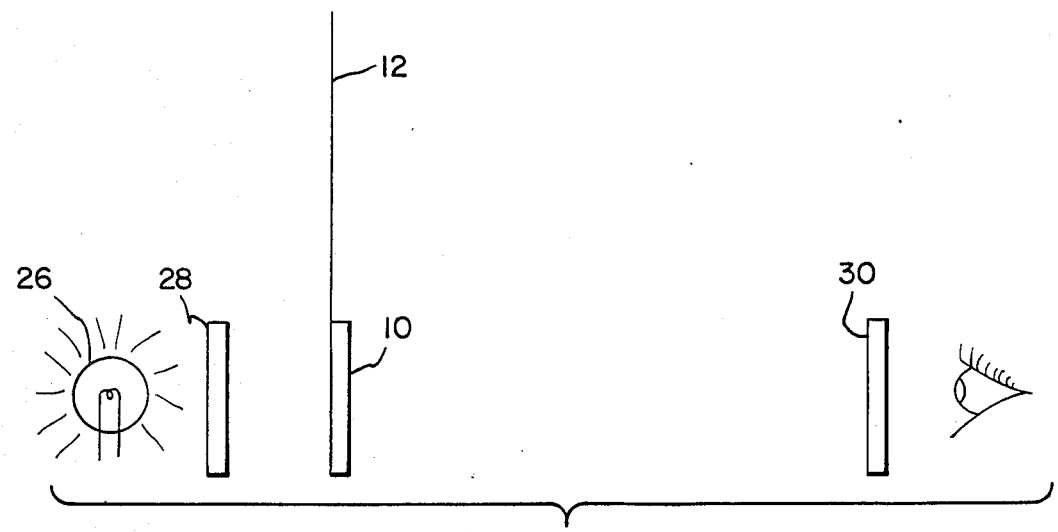
FIG. 3 is a view of the subtitle viewing system of the present invention using backlighting.
Figure 4:
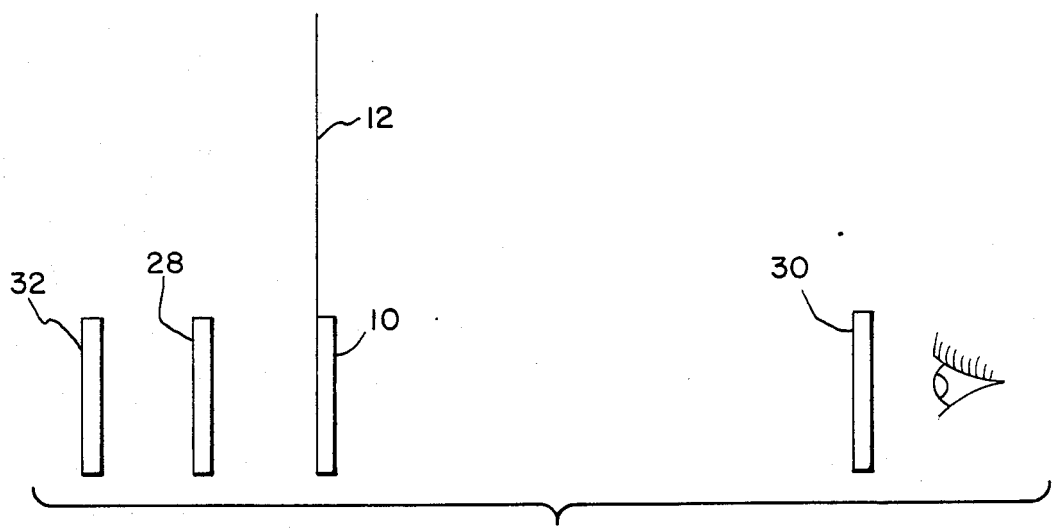
FIG. 4 is a side view of the subtitle viewing system of the present invention using reflected light.

FIGS. 3 and 4 show alternate methods of allowing only those individuals wishing to see the subtitles, to read the liquid crystal display. In FIG. 3, liquid crystal display 10 is located along the bottom of screen 12 and is backlit by a low intensity light source 26. A polarizer 28 is placed between the light 26 and the liquid crystal display 10 so that the light passing through the liquid crystal display is polarized. A second polarizer 30, which preferably is mounted on a pair of glasses worn by an individual in the audience wishing to view the subtitles, is either cross-polarized with respect to polarizer 28 or is polarized in the same direction depending upon whether light or dark alphanumeric images are desired. As is well known, the liquid crystal display upon being properly driven by the driver circuit produces an alphanumeric image cross-polarized with respect to the background of the display 10. It is clear that those not wearing the polarized lenses 30 will not be able to view the subtitles and will only see polarized light emanating from the display 10 as a faint haze.

In FIG. 4, light 26 is replaced by a mirror 32 which reflects the light being generated by the projector in its display of the film, back through the polarizer 28 as previously described. Again, only those wearing the polarized lenses 30 will be able to distinguish the background from the alphanumeric images and view the subtitles produced on liquid crystal display 10.

While the above description refers only to use of the subtitle display system in a movie theatre, this system can be used in any situation where it is desired to display visual information only to selected members of a group. In addition, any display device which produces polarized images that are cross-polarized with respect to a background may be used. While only two examples and embodiments of the present invention have been shown and described, it is obvious that many changes and modifications may be made thereunto, without departing from the spirit and scope of the invention.

What is claimed is:

1. An apparatus for displaying movie subtitles in closed caption from independently of the screen displaying the visual images comprising:
    a liquid crystal capable of forming alphanumeric images in plane polarized light on a cross-polarized background;
    decoding means capable of reading and transmitting coded dialogue information on standard movie films;
    a microprocessor coupled to said decoding means and capable of producing a dialogue output based on input information provided by said decoder;
    a means for driving said liquid crystal display in response to said output of said microprocessor to thereby display appropriate subtitles formed by said liquid crystal display; and,
    a polarizing material provided to selected viewers to enable said viewers to distinguish said alphanumeric subtitles from said liquid crystal display background, said polarizing material to be placed over the eye and is generally cross-polarized with respect to one of said plane polarized alphanumeric images or said cross-polarized background.

2. A system for displaying movie film subtitles as set forth in claim 1, wherein said polarizing material is cross-polarized with respect to said alphanumeric display, thereby producing black images on a lit background.

3. A system for displaying movie film subtitles as set forth in claim 1, wherein said polarizing material is cross-polarized with respect to said polarized light background, whereby light alphanumeric images are formed on a dark background.

4. A system for displaying movie film subtitles as set forth in claim 1, wherein said means for driving said liquid crystal display includes a detector means for sensing the presence of coded signals associated with the media recording the visual cinematic display.

5. An apparatus for displaying movie subtitles as set forth in claim 4, further including a processor means capable of forming a subtitle in response to an input signal from said detector means.

6. An apparatus for displaying movie subtitles as set forth in claim 5, including a driver means capable of forming the appropriate alphanumeric images on said liquid crystal display in response to an output of said processor means.

7. An apparatus as set forth in claim 1, wherein the light source for said liquid crystal display is a low intensity light source located to the rear of the polarizer forming said polarized light background of said liquid crystal display.

8. An apparatus as set forth in claim 1, wherein the liquid crystal display utilizes as a light source a light emanating from the movie projector projecting the visual images on a standard movie screen.

9. A device for displaying selectively viewable alphanumeric information in conjunction with visual images, comprising:
    a visual image recording media having coded signals thereon corresponding to said alphanumeric information;
    a means for forming viewable images from said image recording media;
    a detector means for sensing the presence of said coded signals;
    a processor means coupled to an output of said detector for processing said sensed signals to form an alphanumeric output;
    a display means based on said alphanumeric output of said processor, for producing an image in plane polarized light, an alphanumeric display on a generally cross-polarized light background; and,
    polarized viewing means capable of selective utilization by viewers, said polarized viewing means generally cross-polarized with respect to one of said plane polarized light or said cross-polarized background to thereby render said alphanumeric display readable.

10. A device as set forth in claim 9, wherein said display means is a liquid crystal display.

* * * * *